J. H. MALLON.
BEVERAGE SERVER.
APPLICATION FILED JUNE 12, 1918.
1,278,703.
Patented Sept. 10, 1918.
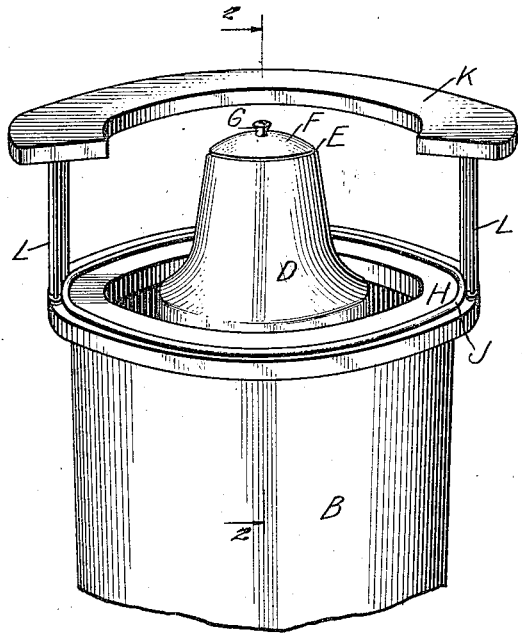
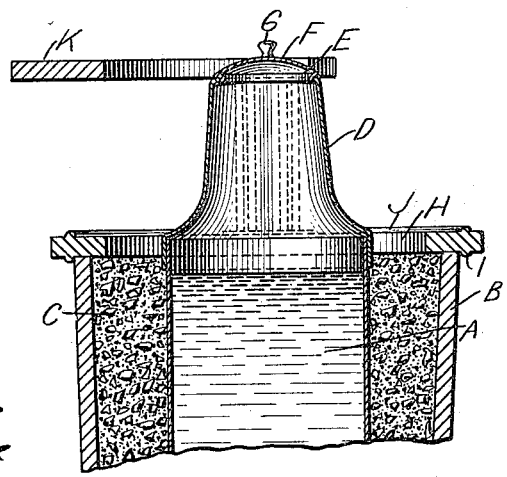
WITNESSES
INVENTOR
James H. Mallon
BY
ATTORNEYS

UNITED STATES PATENT OFFICE.

JAMES H. MALLON, OF ATLANTIC CITY, NEW JERSEY.

BEVERAGE-SERVER.

1,278,703. Specification of Letters Patent. Patented Sept. 10, 1918.

Application filed June 12, 1918. Serial No. 239,694.

*To all whom it may concern:*

Be it known that I, JAMES H. MALLON, a citizen of the United States, and a resident of Atlantic City, in the county of Atlantic and State of New Jersey, have invented a new and Improved Beverage - Server, of which the following is a full, clear, and exact description.

My invention has for its object to provide a beverage server having a bell shaped cap for disposal over a tank, the tank having a relatively small opening in its top which is normally closed by a lid having a knob by means of which the lid may be conveniently raised from the bell shaped cap and which serves to complete the resemblance of the cap to a bell.

The tank is preferably of the kind usually used for ice cream and it is disposed in a tub on which rests a circular rack for glasses, the bell shaped cap with the rack converting the ice cream tank and the tub therein into an orangeade or other beverage server.

Additional objects of the invention will appear in the following specification in which the preferred form of my invention is described.

In the drawings similar reference characters refer to similar parts in all the views, in which Figure 1 is a perspective fragmentary view showing how my invention is used on a tank and tub.

Fig. 2 is a sectional view on the line 2—2 of Fig. 1.

By referring to the drawings, it will be seen that the beverage is contained in a tank A which is of the ordinary ice cream variety and which is disposed in a tub B containing ice and salt C, or some other refrigerating agent.

My bell shaped cap D is disposed on the tank A serving to close the top of the said tank. The top E of the bell shaped cap D is open and normally closing this opening there is a lid F which is provided with a knob G which serves as a handle. This knob G increases the resemblance of the cap D to a bell. Disposed on the rim of the tub B there is a circular rack H provided with a bead I which rests against the side of the tub B to prevent lateral movement of the rack H relatively to the tub. The rack H is preferably disposed with another bead J which extends upwardly from the top of the rack H and serves as a means to prevent the displacement of glasses which may be disposed on the rack H. In addition to the rack H, there is another rack K which is semi-circular and which is supported above the rack H by standards L.

It will be seen by referring to the drawings, that the bell shaped cap with the racks which have been described, not only completely changes the appearance of the tank and tub, but that it also makes it possible to make use of the tank and tub in an entirely new manner.

Having thus described my invention, I claim as new and desire to secure by Letters Patent:

1. In combination with a tank disposed in a tub and spaced therefrom, a cap disposed on the tank and having upwardly converging sides and open at the top, a lid normally closing the top of the tank, and a rack disposed on the tub.

2. In combination with a tank disposed in a tub and spaced therefrom, a cap disposed on the tank and having upwardly converging sides and open at the top, a lid normally closing the top of the tank, a circular rack disposed on the tub, a semi-circular rack disposed over the first rack, and standards on the first rack for supporting the second rack.

3. In combination with a tank disposed in a tub and spaced therefrom, a bell shaped cap disposed on the tank and open at the top, a lid normally closing the top of the tank, and a rack disposed on the tub.

4. In a beverage server, a cap for disposal on a tank having upwardly converging sides and being open at the top, a lid for closing the top of the cap, and a circular rack in which the cap is normally disposed.

JAMES H. MALLON.

Copies of this patent may be obtained for five cents each, by addressing the "Commissioner of Patents, Washington, D. C."